Figure 2:
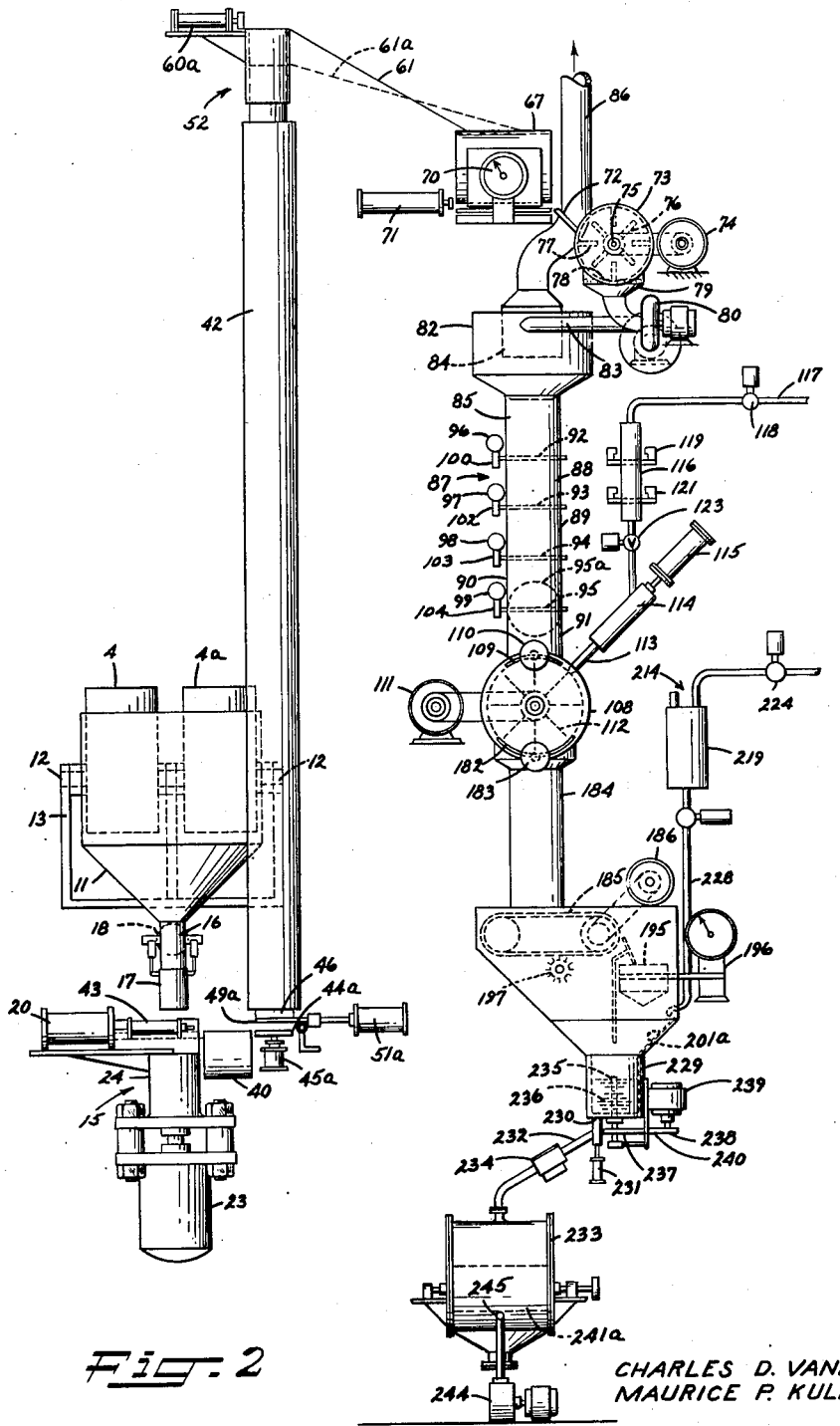

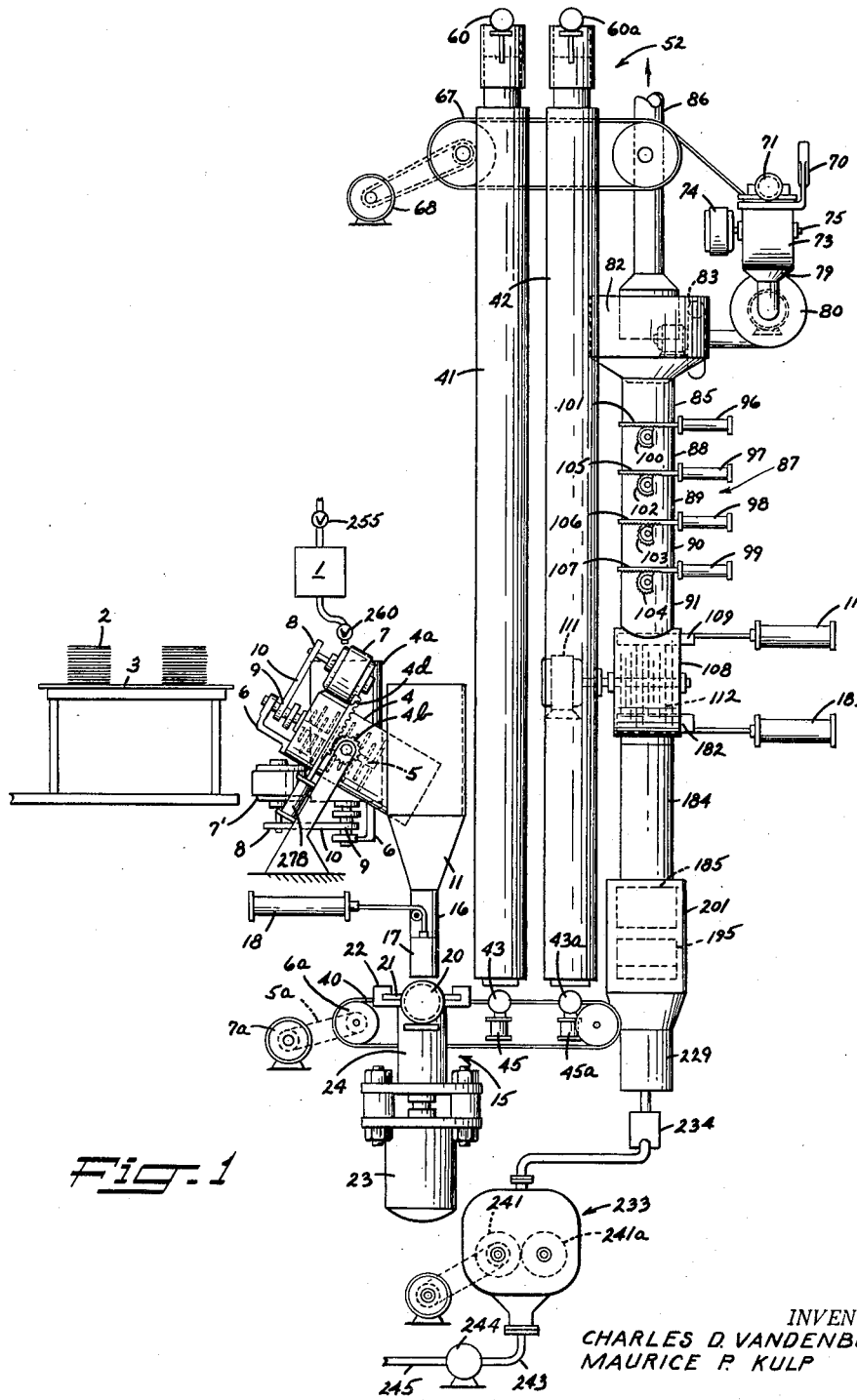

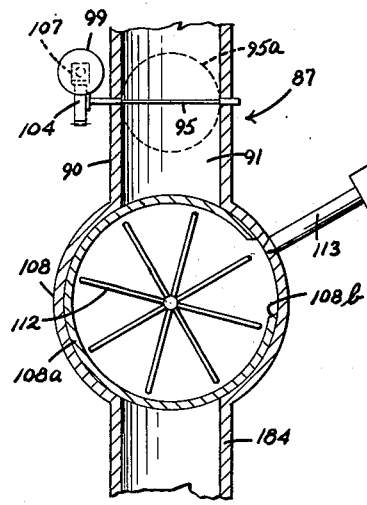
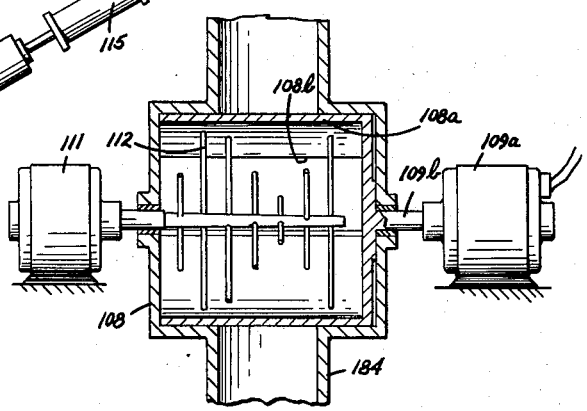
Fig. 1A  Fig. 1B
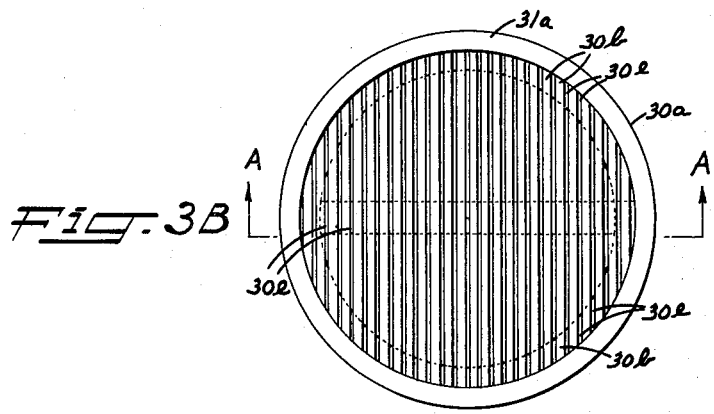
Fig. 3B
Fig. 3C
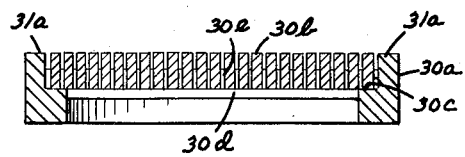

Aug. 11, 1953    C. D. VANDENBURGH ET AL    2,648,661
METHOD AND APPARATUS FOR PRODUCING VISCOSE
Filed Feb. 3, 1950    7 Sheets-Sheet 3

INVENTORS.
CHARLES D. VANDENBURGH
MAURICE P. KULP
BY
ATTORNEY.

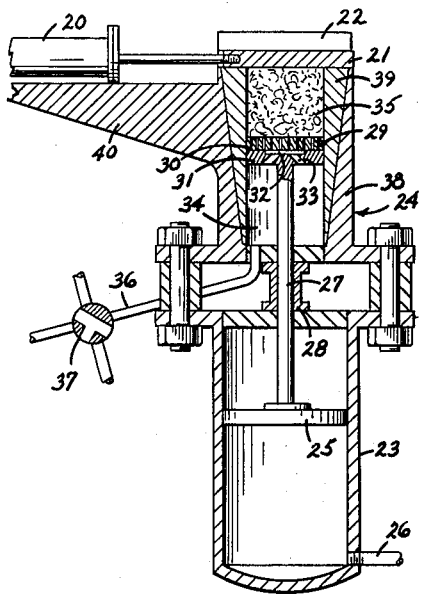
Fig. 3
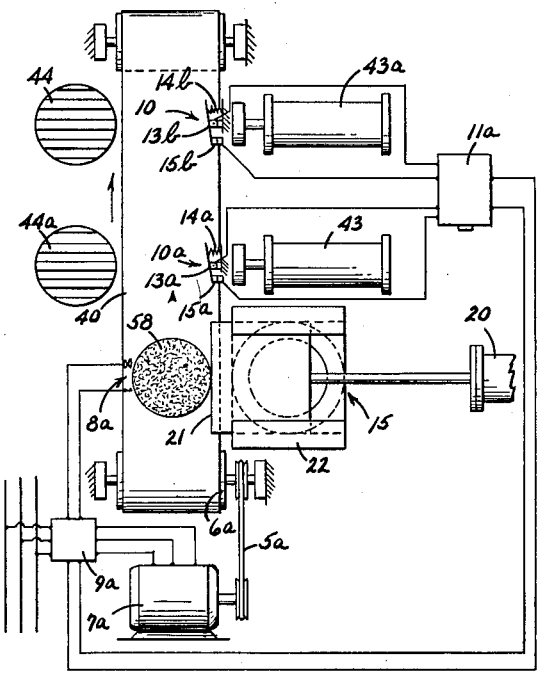
Fig. 4
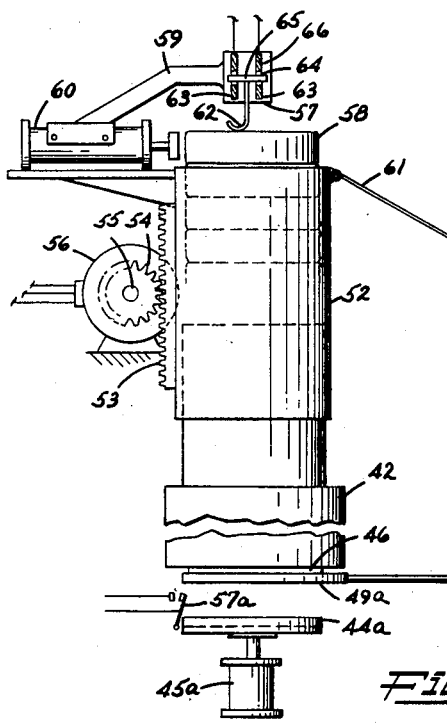
Fig. 6
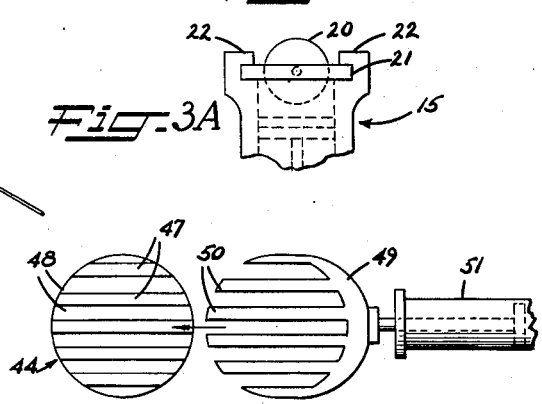
Fig. 3A
Fig. 5
INVENTORS.
CHARLES D. VANDENBURGH
MAURICE P. KULP
BY Thomas B. O'Malley
ATTORNEY.

Aug. 11, 1953   C. D. VANDENBURGH ET AL   2,648,661
METHOD AND APPARATUS FOR PRODUCING VISCOSE
Filed Feb. 3, 1950   7 Sheets-Sheet 5
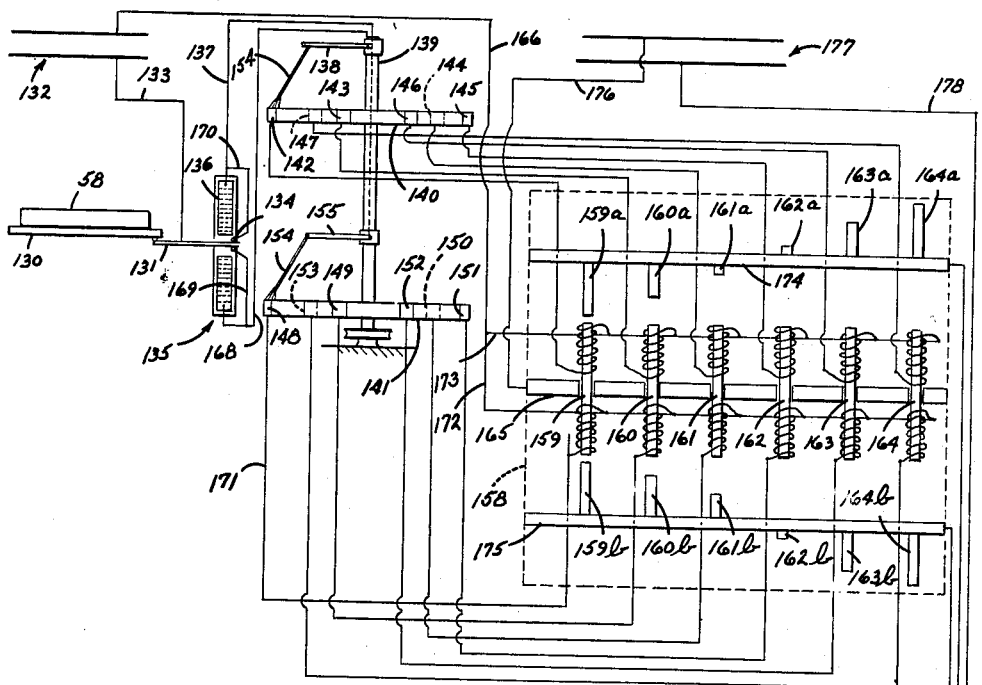
Fig-7
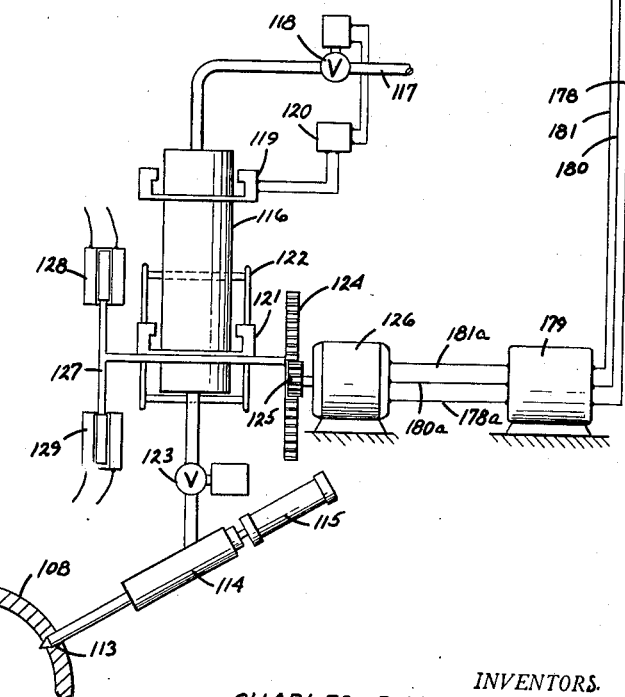
INVENTORS.
CHARLES D. VANDENBURGH
MAURICE P. KULP
BY
Thomas R. O'Nally
ATTORNEY.

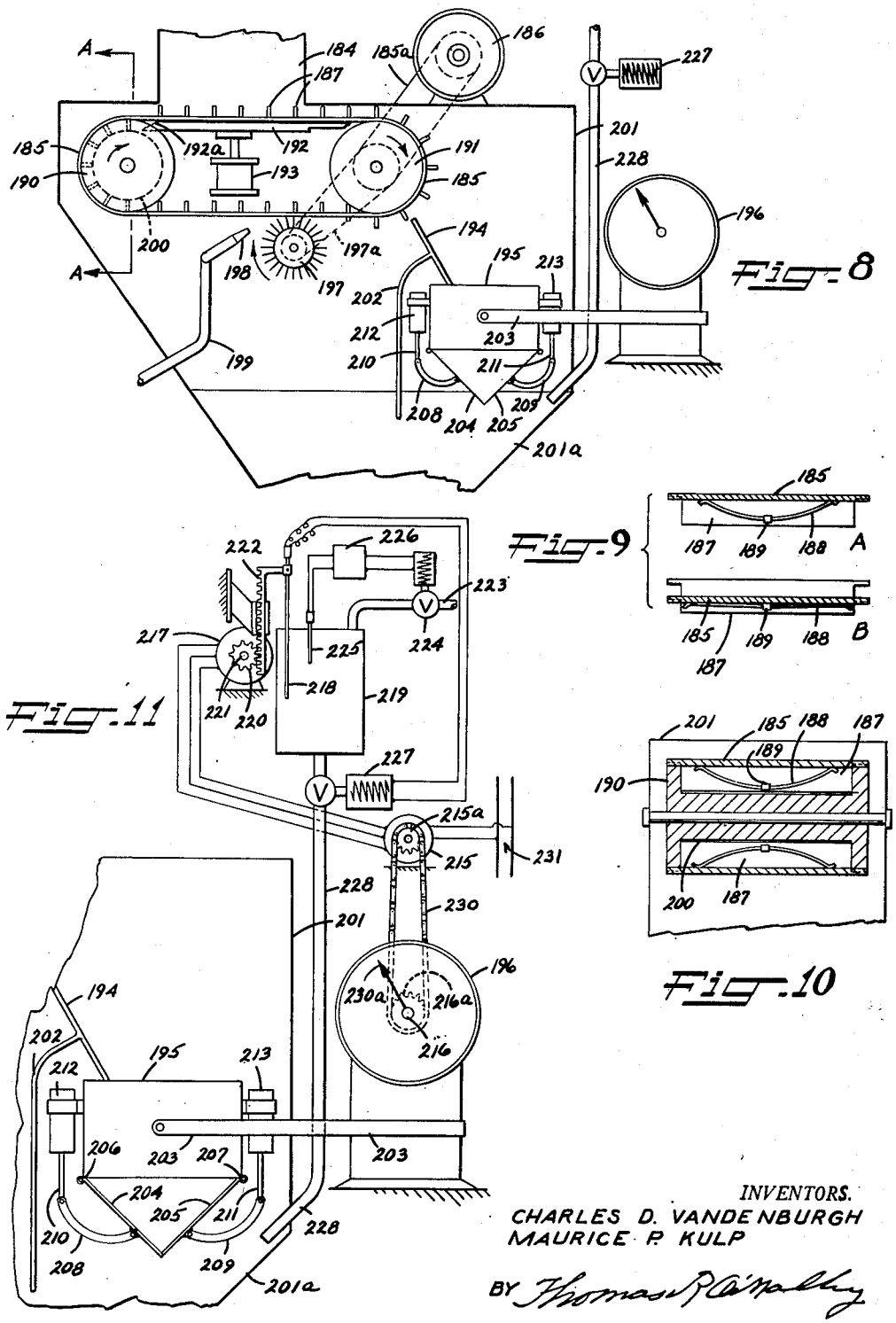

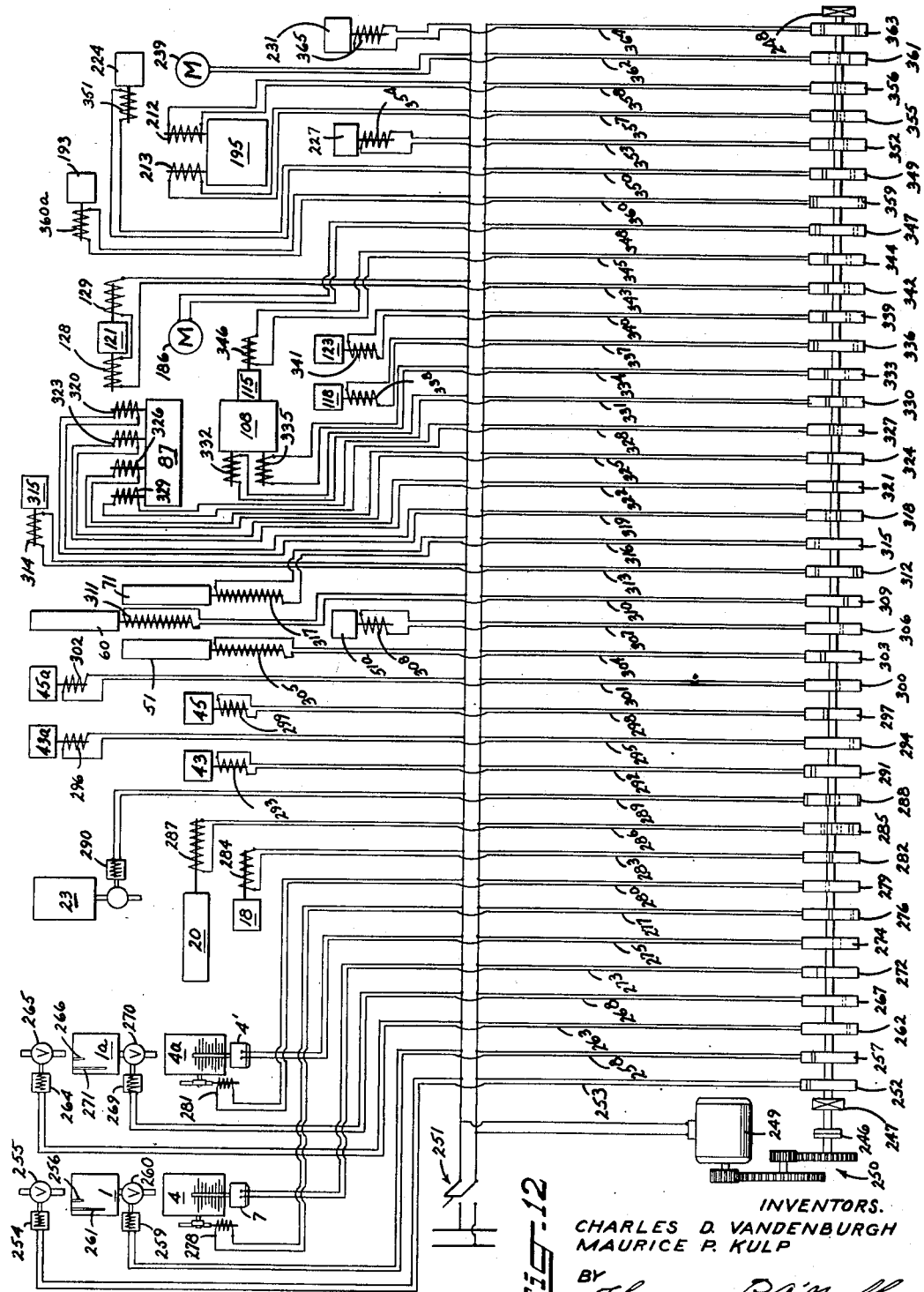

Patented Aug. 11, 1953

2,648,661

UNITED STATES PATENT OFFICE

2,648,661

METHOD AND APPARATUS FOR PRODUCING VISCOSE

Charles D. Vandenburgh, Charlestown, Md., and Maurice P. Kulp, Marcus Hook, Pa., assignors to American Viscose Corporation, Wilmington, Del., a corporation of Delaware Application February 3, 1950, Serial No. 142,172

23 Claims. (Cl. 260—217)

This invention relates to a method and apparatus for the production of viscose spinning solutions for the manufacture of artificial fibers, filaments, films, and the like. More particularly, the invention relates to a continuous process for the production of viscose and the apparatus therefor.

The known, and currently practiced, method of making viscose is the batch process. That is, a predetermined weight of raw cellulose fibers in the form of cotton linters, wood pulp, and the like, is soaked in an alkali solution, pressed to a predetermined ratio of alkali cellulose to dry cellulose, and the pressed product is broken up or shredded. The shredded alkali cellulose is then placed in containers at a constant temperature and humidity for a certain period of time to oxidize or depolymerize the alkali cellulose. The alkali cellulose is then placed in reactors or churns and carbon disulfide added to xanthate the same. The cellulose xanthate is then withdrawn and mixed with dilute alkali to form the viscose solution, which is an alkaline solution of cellulose xanthate.

Numerous difficulties are encountered in the employment of the batch process. Repeated handling is required resulting in loss of material. The error is such that it is difficult to produce two batches alike. The material is in contact with the atmosphere at various stages thus resulting in undesirable oxidation or depolymerization of the material which detracts from the desirable properties of the final product. It is difficult to maintain a constant temperature throughout the entire mass of alkali cellulose while in the aging cans due to the immensity of the masses which is necessary in the batch process in order to produce practical size batches of viscose.

In the standard procedure for xanthating alkali cellulose, i. e., placing the alkali cellulose crumb in an agitator or churn and adding carbon disulfide while agitating the crumbs, chemical reaction between carbon disulfide and the alkali cellulose takes place rapidly at the surface of the crumbs. The crumbs then become sticky and agglomerate into lumps or coherent masses of varying sizes which adhere to the walls and mixing blades of the churning mechanism. This impedes agitation and the carbon disulfide does not penetrate into the interior of the crumbs which thus have a surface of cellulose xanthate encasing a core of unreacted alkali cellulose, and the final product of this step in the process does not consist entirely of cellulose xanthate. In order to even partially offset these difficulties, a large excess of carbon disulfide is necessary. As a consequence some unreacted carbon disulfide will be present in the final product when it is removed from the xanthating drum or the like. Thus, when the crumbs are dissolved in dilute alkali to produce the viscose solution, the excess carbon disulfide carried by the crumbs, but not distributed therethrough, reacts with the alkali to form by-products which must be removed prior to spinning the viscose and which if not removed complicate the filtering step and impair the properties of the products that are produced when viscose is subjected to various coagulating and regenerating conditions.

In addition to the disadvantages aforesaid, it is obvious that by operating in separate batches costly interruptions become necessary for such purposes as transferring the material from one operation to another, e. g., steeping to shredding, cleaning the shredder or xanthating drum, or refilling the same with a new batch, and discharging the completed batch. Considerable difficulty is also encountered in the handling of carbon disulfide owing to its high volatile and inflammable character and consequent tendency to cause dangerous explosions. Also, carbon disulfide is extremely toxic. Consequently, due to repeated opening and closing of the xanthating drums to remove batches therefrom a large concentration of carbon disulfide builds up in the surrounding atmosphere presenting a vital hazard to the health and well being of workers required to work in the vicinity of the xanthating drums. This requires, therefore, the installation of expensive ventilating equipment.

Further, the batch process of manufacturing viscose requires the employment of numerous workers to handle the material in the many steps of operation.

It is an object of the present invention to provide a method and apparatus for the continuous production of viscose which overcome the aforementioned difficulties and disadvantages.

Another object of the present invention is to provide a method and apparatus for the continuous production of viscose which is substantially safe.

Another object of the present invention is to provide a method and apparatus for the continuous production of viscose which is automatic and requires little or no manual labor in connection therewith.

Another object of the invention is to produce a uniform viscose free from undesirable impurities.

Another object of the present invention is to provide a method and apparatus for making a predetermined amount of viscose per predetermined unit of time continuously.

Other objects and advantages of the present invention will be apparent from a study of the following description and the accompanying drawing, which is intended merely to be illustrative and not limitative.

The invention generally relates to a continuous method and apparatus for producing viscose. At regular predetermined intervals of time, a predetermined amount or charge of wood pulp is steeped in dilute alkali, such as sodium hydroxide, while it is at the same time beaten into a slurry. The slurry of steeped cellulose is pressed to a predetermined size and weight and the pressed mass of alkali cellulose, while still in cake form, is passed through an aging or oxidizing zone. Each successive charge or cake follows right along behind the preceding charge or cake in the aging zone. Each charge retains its identity throughout the process up to conversion to a viscose solution.

Upon leaving the aging zone, the cakes are broken and fluffed into crumb form. Each fluffed up charge is passed through the xanthating zone. Herein the identity of each charge is maintained and they follow one behind the other. Each charge of alkali cellulose is xanthated, i. e., reacted with carbon disulfide, separately and passed to a mixing zone while retaining the identity of each charge. The xanthated alkali cellulose is dissolved in dilute alkali in the mixing zone and then the resultant solution is homogenized or rolled to removed gels therefrom. The charges, in the form of solutions or slurries, are fed from the mixing zone to the homogenizing zone at such a rate that a continuous flow of viscose leaves the homogenizing zone for the storage tanks or spinning machines or wherever the same is desired to be used.

An important feature of the present invention is the fact that each charge of pulp or cellulose retains its identity throughout the process while at the same time viscose is produced in a continuous uninterrupted flow. Particularly important is the fact that the compressed mass or charge of alkali cellulose is aged or oxidized while being retained in cake form and passed continuously through the aging zone.

By way of illustration, reference is made to the several figures of the drawing for a more detailed description of the invention.

Figure 1 is a front elevation of the overall apparatus,

Figure 1A is a view, partly in section, of an alternative means of charging and discharging the carbon disulfide distributor chamber, Figure 1B is a side elevation, partly in section of Figure 1A, Figure 2 is a side elevation of the overall apparatus, Figure 3 is a view, partly in section, of the steep press, Figure 3A is a side elevation of the top of the steep press showing the plate in position ready for the pressing step, Figure 3B is a plan view of an alternative form of press platen, Figure 3C is a view taken along the line A—A of Figure 3B, Figure 4 is a plan view of the mechanism for conveying the cakes to the bottom of the mercerizing towers, Figure 5 is a plan view of the mercerizing tower loading plunger and forked gate for holding the cakes in the tower, Figure 6 is a side elevation of the adjustable top section of the mercerizing towers, Figure 7 is a diagrammatic view of the carbon disulfide measuring apparatus, Figure 8 is a side elevation of the discharge belt for transferring the cellulose xanthate to the proportioning scale, Figure 9 is a side elevation of a scraper blade used on the discharge belt, Figure 10 is a view taken along the line A—A of Figure 8, Figure 11 is a diagrammatic view of the mixer charge (aqueous sodium hydroxide) measuring apparatus, and Figure 12 is a diagrammatic view of the electrical system used to operate the apparatus as shown in Figures 1 and 2.

As the several steps of the process, and apparatus employed in conjunction therewith, of the present invention may be divided into separate phases or stages, the same will be done in the following detailed description of the invention for the sake of clarity.

*Steeping*

In the preferred form of the apparatus, as shown in Figures 1 and 2 of the drawing, the wood and/or cotton pulp sheets 2 are removed from the table 3 and placed in the steep tanks 4 and 4a by any known suitable automatic means or by an operator. In the preferred embodiment as shown, there are employed two steep tanks but it should be understood that any number of such tanks may be employed depending upon the capacity of the apparatus and the speed with which it is operated. Steep liquor measuring devices 1 and 1a supply the correct amount of NaOH to steep tanks 4 and 4a and are similar to the measuring device described hereinafter.

The steep tanks 4 and 4a are each equipped with a spring-wire beater 5 extending upwardly through the bottom of the tanks and supported by the frame 6. The beaters are driven by the motors 7 and 7' fastened to the sides of the tanks 4 and 4a. The motors have pulleys 8 on their shafts which are connected to the pulleys 9 on the spring-wire beater shafts by means of the endless driving belts 10. The purpose of the spring-wire beaters is to tear the pulp sheets up in an approximately 20 to 1 ratio of caustic soda solution and pulp to form a uniform slurry of the same. Each of the steep tanks may have a capacity of one pound of dry pulp and twenty pounds of steeping liquor (caustic soda). The capacity of the tanks, however, may be varied depending on the amount of viscose it is desired to produce per unit time as also may the ratio of caustic soda and pulp be varied. In the preferred embodiment shown, the tanks are 18 inches deep and 18 inches in diameter, inside dimensions.

The steep tanks are set up and arranged to discharge their contents alternately into the hopper 11. To accomplish this, the tanks are pivotally mounted by means of bearings 12 on the frame 13. At predetermined time intervals, the steep tanks are rotated in a clockwise direction by means of solenoid operated racks in mesh with pinions on the shaft 12 and fastened to the tanks. Such an arrangement is shown in Figure 2 on tank 4, wherein 4b is the pinion, 4d the rack, and 278 the solenoid. The tanks are suitably counterbalanced to return them to their normal position when the solenoids connected therewith are deenergized. The tanks are jacketed and lagged for brine for temperature control.

The pulp slurry passes from the hopper 11 to the vertical hydraulic press 15 through the cylindrical conduit 16 over the lower portion of which the vertically movable conduit 17 fits in sleeve-like fashion. When the slurry is dumped into the press, the conduit 17 is lowered by the solenoid actuated cylinder 18 so as to form a continuous conduit extending into the top of the press from the hopper and thus prevent splashing. As the conduit 17 descends, the solenoid actuated cylinder 20 removes the plate 21 from the top of the steeping press thus allowing the entrance of the conduit. All the movable parts of the apparatus are actuated at regular and predetermined time intervals by means of electrically controlled solenoids. The electrical system is shown in Figure 12 and will be described hereinafter. When the conduit 17 is again raised, the plate 21 is moved back over the top of the press and held securely in position by means of the clamp-like projections 22 which form an integral part of the outer upper wall of the steeping press. This is more clearly shown in Figure 3A.

*Pressing the slurry*

For a description of the steeping press 15, reference should be made to Figure 3 which shows a sectional view of the same. The press is composed of two sections, the hydraulic section 23 and the pressing section 24. In the hydraulic section which has an air inlet 26 near the bottom thereof, there is a piston 25 fastened to which is the shaft 27 extending upwardly through the bearing 28 and terminating in the press platen 29. The press platen is formed in two sections. The top section 30 is perforated with holes approximately $\frac{1}{32}$ inch in diameter. These holes are of such a diameter so that the cellulose fibers will not be forced into and clog the same during the pressing operation. The under or bottom section 31 has a circular recess 32 in its top surface into which the holes or perforations of section 30 terminate. Extending downwardly from the recess 32 through section 31 are holes 33 opening into the chamber 34 below the press platen. As the slurry of alkali cellulose 35 is pressed against the plate 21, the caustic soda runs through the platen 29 by means of the perforations in section 30, the recess 32, and holes 33 into chamber 34. The caustic soda leaves chamber 34 by means of the tube 36, enters the 3-way valve 37 where it is graded, i. e. as the press platen proceeds upward the caustic soda liberated from the slurry is automatically graded or classified in three classes, depending on the time it was so liberated.

Another form of press platen which is preferred in the practice of the present invention is shown in Figures 3B and 3C. In this embodiment the press platen comprises a ring 30a of any suitable alkali-resistant material, such as stainless steel and the like, so formed as to have a ledge 30c extending outwardly from the inner periphery thereof. The ledge serves to support the pressing bars 30b, the tops of which form a smooth flat surface even with the top surface 31a of ring 30a. The bars 30b are spaced approximately 0.002 inch apart and are approximately ⅛ inch wide. Extending through the center of the ring and even with the surface of the ledge 30c is a supporting bar 30d which may be welded to ring 30a or cast as an integral part thereof. The bar 30d serves to support the pressing bars and the separating discs or shims 30e which do not extend up to the top surface of the pressing bars 30b. Similar shims are placed between bars 30b resting on the ledge 30c. It has been found that pressing action on the surface above the shims or separating discs is not retarded or hindered by the same.

Referring again to Figure 3, the outer wall of the upper section or cylinder of the steeping press is formed in two sections. The outer section 38 decreases in thickness in an upward direction while the inner section 39 increases in thickness in an upward direction. This is conventional in equipment of this type where the wall of a container is increased in thickness to withstand increased pressure. In the present apparatus, pressures up to approximately 3200 lbs. per square inch are attained. The cylinder may be any desired size depending on the size of the cake of alkali cellulose it is desired to produce. In the preferred embodiment shown, there is produced a cake two inches thick and eight inches in diameter, which has been pressed at 3000 lbs. per square inch.

Extending outwardly from the cylinder wall is a supporting frame 40a on which rests the solenoid operated air cylinder 20 which operates the plate 21. When the slurry has been pressed into cake form containing the proper ratio of alkali cellulose to dry pulp, which may be varied depending on the final product but is preferably 2.75 to 1.0, the cylinder 20 is actuated removing the plate 21 from the top of the press cylinder. At the same time the pressure on piston 25 is released thus allowing piston 25 to drop to its starting position. When the plate 21 is completely removed from the top of the press cylinder, the pressure is again applied on the piston 25 and the cake is moved up just out of the press cylinder. The length of piston 25 is so chosen that the upward movement of the same is stopped when the upper surface of the press platen is just even with the top of the walls 39 of the press cylinder. At this point the air cylinder 20 is again actuated and moves the plate 21 to the right as viewed in Figure 3 thus pushing the alkali-cellulose cake ahead of it onto the endless conveyor belt 40, which is driven by the motor 7a (see Figure 4). This belt is driven intermittently at predetermined time intervals. The plate 21 is again retracted, the conduit 17 is lowered into the press cylinder and the next batch of alkali cellulose slurry dumped in. In the meantime the pressure on the piston 25 has been released thus dropping the press platen to the bottom of the press cylinder ready for the next operation on the next batch of slurry.

The belt 40 is preferably made of stainless steel. It should be understood that all parts of the mechanism that are in direct contact with caustic soda are made of alkali resistant material such as stainless steel, and the like. By means of the belt 40, the alkali cellulose cake is conveyed to the base of one of the mercerizing or aging towers 41 and 42. In the preferred embodiment shown, there are two such towers but it should be understood that only one or more than two may be employed depending on the speed of operation of the apparatus.

The pressed cakes are conveyed to alternate towers, i. e. every other cake will enter the same tower. At the proper point, as determined by either of the limit switches 10a and 10b, shown in Figure 4, when the cake is opposite the base of one of the towers, say 41, an air cylinder pusher 43 pushes the cake from the belt 40 to the platen 44 of the tower charger, which is operated by air cylinder 45. There is a pusher and tower charger positioned adjacent each tower employed and hooked up electrically to be actuated alternatively.

Referring to Figure 4, the transfer belt 40 is driven by the belt 5a connected between the drive roller 6a of belt 40 and the driving motor 7a. The alkali cellulose cake 58 controls both the starting and stopping of the drive motor. When the solenoid connected to cylinder 20 is energized, the plate or press cover 21 is pushed forward, pushing cake 58 onto the belt 40 which is at rest. The cake contacts the motor starter switch 8a closing the circuit and starting the motor. At the same time, a holding coil or switch in the sealed switch box 9a is energized thus maintaining the circuit to the motor after the cake moves away from the starter switch 8a. The motor is not cut off until the cake contacts either of the limit switches 10a or 10b positioned adjacent the cake pushers 43 and 43a respectively. The limit switches are connected through a time controller 11a with the motor starter mechanism 9a. The purpose of the time controller is to pass the current through switch 10a and then 10b alternately and at predetermined time intervals such that every other cake will be positioned adjacent the bottom of the same mercerizing tower.

As the cake proceeds along on the belt, it hits the metal switch blade 12a of switch 10a and causes the same to pivot about the contact point 13a against the compression spring 14a thus breaking the contact at 15a which in turn deenergizes the holding switch in 9a and stops the motor and belt. Cake 58 is then in position to be pushed onto platen 44. The next cake will contact and pass limit switch 10a since by reason of the time controller 11a the circuit is completed through switch 10b. When the cake reaches switch 10b, the same action takes place and the belt stops with the cake in position to be pushed onto platen 44a. This process continues alternately at predetermined time intervals between limit switches 10a and 10b as each cake of pressed alkali cellulose proceeds to the mercerizing towers 41 and 42.

*Mercerization or aging*

When the cake rests on the platen 44a, the air cylinder 45a is actuated raising the platen thus pushing the cake in position in the bottom of the tower as shown at 46. The top surface of the platens 44 and 44a is grooved along parallel strips 48 leaving intermediate raised surfaces or lands 47 arranged alternately as shown in Figure 5. The purpose of this arrangement on the platen surface is to allow the reception of the forked gates 49 and 49a while the cake is on the platen. The prongs 50 slide into the recesses 48 of the platen thus forming a smooth continuous surface in contact with the cake on the platen. The forked gates are actuated by the solenoid operated air cylinders 51 and 51a (see Figure 12). When the platen is retracted, the forked gate holds the cake in the tower and the same is not again retracted until another cake is ready to be placed in the tower.

The mercerizing towers may be of any convenient size depending on the size of the cakes and the length of time it is desired that the same remain in the towers. The towers may also be in any other position rather than vertical, e. g. horizontal, if desired, with corresponding adjustment and rearrangement of accompanying equipment. In the embodiment shown each tower has an inside diameter of 9 inches and is 32 feet high or of adequate length to allow for a 32-hour mercerizing time for each cake. Each tower is jacketed in five separate sections over its length so that different temperatures may be maintained to increase or decrease the rate of mercerization or oxidation. Each tower is equipped with an adjustable top section 52 which is automatically adjustable in length to make up for any differences in cake thickness or slight changes in mercerizing times.

The adjustable top section 52 of the towers is shown more clearly in Figure 6. The adjustable section is moved by means of a rack 53, fastened to the side of 52, and pinion 54 on the shaft 55 of the reversible slow speed brake-controlled motor 56. The direction of rotation of the motor is determined by the two-way drop switch 57 which in turn is actuated by the position of the alkali cellulose cake 58. The switch is fastened by the frame 59 to the adjustable section 52 and moves with it. Also attached to section 52 is the solenoid operated air cylinder cake pusher 60a. The operation of this section of the apparatus is as follows: when in operation the tower is filled with superimposed alkali cellulose cakes. As a new cake is pushed into the bottom of the tower, an aged cake is pushed out of the top of the tower in position to be pushed down the slide or chute 61 by the cake pusher 60a. As shown in Figure 6, the cake 58 is in the proper position for this operation. However, it is possible, and highly probable, that all the cakes will not be of the same thickness. When a thin cake is pushed into the bottom of the tower, the uppermost cake will not come completely out of the tower. This causes the metal contact piece 62 of the switch 57 to drop to contact the cake. In doing so, it makes contact with the lower metallic contacts 63, the middle section 64 being non-conducting or insulated. When the contact is made, the motor 56 is started in a clockwise direction moving section 52 down to uncover the top cake. The switch moves also thus causing the contact bar 65 of the drop piece 62 to again come in contact with the insulated portion 64 cutting off the motor. Now the cake is in position to be pushed down the slide 61. The pusher 60a is operated on a time cycle which is such that sufficient time is allowed for the adjustment operation. In the event the cake entering the bottom of the tower is thicker than normal the drop piece is pushed up by the emerging cake until the contact bar 65 comes in contact with the upper metallic contacts 66 which in turn actuates motor 56 in a counterclockwise direction thus moving section 52 upwardly until the bar 65 again comes in contact with the insulated section 64, cutting off the motor.

When the top cake is pushed down the slide 61, the contact piece 62 will naturally drop since it is no longer supported. Contact will be made with the lower metallic contacts 63 which would normally start the motor and lower section 52 before the next cake is ready to be positioned in the lower end of the tower. To avoid starting of the motor at this stage, the switch 57 is cut in and out by the tower loading platen 44a. When a cake is placed on platen 44a and the same starts upward, the cake closes the switch 57a, arranged in series with 57, completing the circuit to switch 57. While the forked supporting gate 49a is being placed in position supporting the cakes in the tower, the section 52 is adjusted. As platen 44a recedes, after gate 49a is in position, it contacts switch 57a opening the same and breaking the circuit to switch 57. Thus the motor 56 cannot be started after removal of the top cake 58 and will not be started until switch 57 is again cut in by the raising of the platen 44a. When more than one mercerizing tower is employed, such as in the preferred embodiment shown, each tower is equipped with an adjustable top section as just described.

Disintegration of the cakes

As the cakes are discharged from the top of the mercerizing tower, they are conveyed by the slide or chute 61 to a continuously running stainless steel belt 67 which is driven by the motor 68. The slide or chute 61 is fastened to section 52 by the hinged joint 69. The purpose of this is to allow the chute to pivot as the adjustable tower section 52 is moved vertically. This is demonstrated by the dotted line position 61a of the chute in Figure 1.

The belt 67 discharges the cakes onto a recording selector scales 70. The purpose of the scale is to record the weight of each individual cake and by means of an automatic selector or time delay relay connected therewith, to select the correct charge of carbon disulfide to be used in the subsequent xanthation of each cake. The carbon disulfide selecting and measuring apparatus is described hereinafter.

After the cake has been weighed, the solenoid operated air cylinder cake pusher 71 is actuated pushing the cake down the chute or slide 72 into the cake breaker 73. The cake breaker is operated by the motor 74 and comprises a heavy shaft 75 with arms 76 extending outwardly therefrom and spaced equidistant along the shaft such that as the shaft rotates the arms 76 will pass between the stationary grizzly bars 77, extending inwardly from the outer wall of the breaker. Any suitable breaker may be employed. The one shown will break the cakes into pieces approximately two inches in size or smaller. The breaker may have a removable bottom which would be controlled by a solenoid operated air cylinder, the operation of which would be synchronized with the rest of the apparatus. In a mechanism such as this, at a predetermined time, the bottom of the breaker would be pulled to one side thus allowing the broken up alkali cellulose cake to drop through to the crumb fluffers. In the embodiment shown, it was found convenient to provide a perforated bottom 78 to the breaker, the perforations being of a predetermined size to permit the passage of the alkali cellulose when sufficiently reduced in size.

The broken up cake drops into the hopper 79 and then into the blower 80 where the cake is completely broken up into a soft fluffy crumb by the impact of the blower wheel in conjunction with the turbulence of the air therein. The crumb then passes to a second blower 81, arranged in series. It is, of course, to be understood that only one or more than two of such blowers may be arranged in series or one blower may be used with a duct system for recirculating the crumb through the blower. Also, it may be desirable to wash the air entering the system in order to prevent the formation of sodium carbonate in the alkali cellulose crumb.

The fluffed up crumb of alkali cellulose then passes into an air-crumb separator 82 by means of the tangential entrance 83. The crumb drops through the bottom hopper-like portion 83 of the air-crumb separator into the first or top hopper or compartment 85 of the CS₂ vapor-seal chamber 87 while the air passes out through the outlet 84 and conduit 86. The air outlet is a cylindrical screen basket extending down into the air-crumb separator, the purpose of which is to prevent the escape through the air-duct of any of the lighter fluffed up crumbs.

Carbon disulfide vapor-sealing

The $CS_2$ vapor-seal chamber 87 is in the form of a cylinder open at both ends and divided into any number of separate compartments. In the embodiment shown, there are five such compartments, 85, 88, 89, 90 and 91. The seal chamber is lagged with insulation to prevent, as much as possible, condensation or temperature change. The compartments are formed by the spaced butterfly dampers 92, 93, 94 and 95. The dampers comprise a circular steel plate having two trunnions, one at either end of a common diameter, on which they revolve through a 90° arc. The dampers are actuated by the solenoid controlled air cylinders 96, 97, 98, and 99. To one of the trunnions of each damper is keyed a pinion 100 on which is a rack 101 which in turn is connected to the air cylinder and actuated thereby. Each damper is similarly equipped, pinions 102, 103 and 104, and racks 105, 106 and 107 being connected with dampers 93, 94 and 95 respectively. The purpose of these dampers is to form a series of absorption chambers or compartments to prevent the escape of $CS_2$ vapor from the distributor chamber that would contaminate the atmosphere around the equipment, and to prevent the waste of any $CS_2$ which may escape from the distributor chamber 108 in which mixing is performed.

The fluffed-up alkali cellulose crumbs pass through the seal chamber to the distributor chamber by intremittent movement from one compartment to another. When the distributor chamber is ready to receive a charge of alkali cellulose, which is one of the original alkali cellulose cakes in fluffy crumb condition, the top arcuate slide gate 109 of the distributor chamber 108 is removed by sliding the same away from the top of the chamber 108. This movement of the gate 109 is accomplished by the solenoid operated air cylinder 110. When the charge of alkali cellulose in compartment 91 has dropped into the distributor chamber through the opening therein presented by the removal of gate 109, the gate 109 is returned to its normal sealing position. Thereafter, in intermittent fashion and in a predetermined timed sequence, the various charges of fluffed alkali cellulose are moved downwardly through the several compartments in the sealing chamber. The damper 95 is rotated 90° as shown by the dotted line position 95a thus dropping the charge from compartment 90 to the vacated compartment 91. Damper 95 is returned to its normal sealing position and damper 94 is rotated 90° dropping the charge from 89 to 90 and so on until all the charges have advanced from one compartment downwardly to the next and compartment 85 is empty and ready to receive the next charge of fluffed-up alkali cellulose coming from the crumb fluffers and air-crumb separator. These various operations are all electrically controlled and timed, as hereinafter described, so that a charge of fluffed alkali cellulose crumb does not enter the air-crumb separator until compartment 85 has been vacated.

Mixing with carbon disulfide

Referring in particular to Figure 1, the purpose of the distributor chamber is to mix or combine the mercerized alkali cellulose crumb and the previously determined quantity or charge of liquid $CS_2$. The mixing is accomplished by violent agitation caused by rotation of shaft 110a by motor 111. Extending outwardly from the shaft such that they almost touch the inside surface of the chamber (¼ inch clearance is sufficient), are spring wire spokes 112 laid out spirally around the same. Extending into the chamber are spraying nozzles 113 (see Figure 2) through which the $CS_2$ is forced into the chamber with the aid of the booster cylinder 114 which is operated by the solenoid actuated air cylinder 115. The distributor chamber is equipped with a brine jacket and a predetermined temperature is maintained inside the same by means of a thermocouple (not shown). The distributor chamber is so designed that the spinner or agitator may be removed and replaced by a stand-by piece of equipment to facilitate periodic cleaning.

Carbon disulfide measuring

In determining the correct amount of carbon disulfide to be added to each cake after it is disintegrated, any suitable selector or time delay mechanism may be employed. The specific embodiment shown in Figure 7 is only one means of accomplishing the desired result and it should be understood that the same is merely intended to be illustrative.

Referring to Figure 7, the carbon disulfide is brought to the measuring or gaging container 116 from a main storage tank (not shown) through the pipe 117 and through the solenoid valve 118. The gaging container may be made of any suitable transparent material which is resistant to $CS_2$. Adjacent the upper portion of the gaging cylinder and stationarily mounted is a photoelectric cell and light source unit 119 which controls the closing of valve 118 through a relay 120. Adjacent the lower end of the gaging container is another photoelectric cell and light source unit 121 which is movably mounted on a vertical track 122. The units are so mounted that the beam of light passes through the container to the cell.

The main control system opens the valve 118 allowing the container 116 to fill up until the $CS_2$ breaks the beam of light on the cell of unit 119 which causes the valve 118 to close. After unit 121 has been positioned, solenoid valve 123 which is operated by the main control system is opened and $CS_2$ runs into cylinder 114 until the $CS_2$ uncovers the light source in unit 121 which causes the valve 123 to close. Thus the amount of $CS_2$ run into cylinder 114 is an amount equal to that between the units 119 and 121 in container 116. This amount is variable depending on the weight of alkali cellulose in the distributor chamber 108.

Fastened to one side of unit 121 is a vertical rack 124 in mesh with a pinion 125 on the shaft of the selsyn motor 126. The rack and pinion serve to raise or lower the unit 121. Attached to the other side of unit 121 is a vertical metal bar 127 with its ends terminating in the oppositely acting solenoids 128 and 129 which in turn are actuated by the main control system. The purpose of the bar and solenoids is to return the unit 121 to the starting or neutral point after each charge of $CS_2$ has been passed to cylinder 114. The rack 124 is counterbalanced so that the same will remain at any position in which it is set. The bar and solenoid mechanism is adjustable so that the starting or neutral position of unit 121 may be varied as desired.

The position of unit 121 is determined by the weight of the alkali cellulose cake which, though previously weighed, is now in fluffy crumb form in the distributor chamber ready to be mixed with the $CS_2$. The operation is as follows: the compressed alkali cellulose cake 58 coming from the mercerizing tower comes to rest on the platform 130 of the proportioning scale 70, which is of the conventional type having an automatic release on the platform when a load is placed thereon, and as it does, it releases the same such that the scale platform is free to move up or down. The scale is previously set at a position corresponding to the ideal or desired weight of each cake depending on the size or charge of dry pulp used at the start. Extending outwardly from platform 130 is a metallic bar or contact 131 which is attached to the power source 132 by line 133. When the cake on the scale is of the desired weight, the contact bar 131 is on the central portion 134 of the vertical bar 135 in contact with both lead lines 169 and 170 which in turn, however, are not in contact with each other. When this occurs, the selsyn motor 126 will not be actuated since the current is passing through the coils on both ends of the bars in the time delay relay 158 and they remain in neutral position, and the $CS_2$ which will be added to the distributor chamber when this cake reaches the same will be that in the gaging container between units 119 and 121 when the latter is in the neutral or starting position which has been previously set to correspond with the ideal cake weight based on the original charge of dry pulp. However, in actual operation, the weight of the cakes may vary from the ideal and allowance must be made for the same in order to produce a uniform product.

When the cake is lighter than the ideal weight, the scale platform 130 moves up bringing the contact bar 131 in contact with the upper rheostat section 136 of the vertical bar 135. Section 136 decreases in resistance in an upward direction. Thus, contact is made sending a current through line 137 to the revolving arm 155. This arm extends outwardly from a revolving post 139 extending vertically through the centers of the plates or discs 140 and 141. The plates or discs are made of an insulated material except for the metallic inserts 142, 143, 144, 145, 146 and 147 equally spaced around the periphery of disc 140 and metallic inserts 148, 149, 150, 151, 152 and 153 equally spaced around the periphery of disc 141. Extending down from the outer end of the revolving arm 155 is a metallic spring contact 156 which slides along the outer top surface of the disc 141 as the arm is revolved and periodically comes in contact with the metallic inserts. An arm 138 with a metallic spring contact 154 attached to its outer end is positioned above disc 140 and revolves with arm 155 in the same relative position. The post 139 is rotated by an electric motor (not shown) which is synchronized with a clock so that it makes one complete revolution every so many minutes depending on the time cycle with which the entire apparatus is operated.

When the cake is being weighed, the spring contacts are in contact with one of the metallic inserts, such as 142 and 148 as shown in Figure 7. When the next cake is weighed, they will be in contact with the next succeeding metallic inserts, such as 143 and 149, and so on around the discs. The time interval between contacts is synchronized with the time interval between discharge of the cakes from the mercerizing tower or towers and the time cycle of the entire apparatus.

The current which has reached arm 155 passes through the spring contact 156, metallic insert 148 and line 171 to the time-delay relay 158. The line 171 terminates at one end of a coil which in turn encircles one end of a horizontal or vertical metallic bar 159 which is movably positioned on the transverse metallic bar 165 in such a manner that when once moved it will remain in the position to which moved. A convenient manner of accomplishing this is to provide a slot with a spring on either side in bar 165 into which bar 159 is inserted and have the same held in position by the springs. The current passes through the coil and out of the relay through the lines 172 and 166 back to the power source 132 thus completing the circuit. When the coil is thus energized, it moves the bar 159 downward, as viewed in Figure 7, through a distance corresponding to the current passing through the coil. The bar 159 is now positioned. The metallic contact 156 passes over the insert 148 and breaks the circuit. The cake 58 is pushed off the scale to the cake breaker and the scale is reset automatically at the neutral or starting position with contact 131 on the central portion 134 of bar 135. For each of the metallic inserts in disc 140 and those in disc 141 which are in the same relative position as the inserts in 140, there is a vertical or horizontal bar in the time-delay relay 158 having oppositely wrapped coils about either of its ends. The coils on the upper end of the vertical or horizontal bars in the time-delay relay move the bars upward when actuated by a current passing through the lower portion 167, which is a rheostat section such as 136 and decreasing in resistance in a downwardly direction of the bar 135, through line 168, arm 138, metallic contact 154, insert 142, and line 157 to the upper coil, and then through lines 173 and 166 to the power source 132 completing the circuit. When the cake is of ideal weight and the contact 131 remains on the central portion 134 of the bar 135, the current passes to both coils on the vertical bar 159 in the relay thus centering the same about a center line formed by the transverse supporting bar 165.

There are, in the embodiment shown, six vertical or horizontal bars, 159, 160, 161, 162, 163 and 164, one for each cake weighed before the first one weighed is ready to be mixed with CS₂. This number may be varied, of course, to correspond with the number of cakes weighed in the interim between weighing the first cake and mixing the same with CS₂.

In the time-delay relay 158, extending parallel to bar 165 and positioned equidistant on either side of the same, in the same plane, are two rotatable metallic shafts 174 and 175. Extending outwardly from the shafts and spaced equidistant along the same are flexible metal strips arranged in spiral fashion around the shafts. These strips are designated in Figure 7 as 159a, 160a, 161a, 162a, 163a and 164a on shaft 174 and 159b, 160b, 161b, 162b, 163b and 164b on shaft 175. The flexible metallic strips are of such length that when the bars 159 through 164 inclusive are centered on the bar 165 the strips come in close proximity to but do not touch the ends of the said bars 159–164. The bars 174 and 175 are rotated by a slow speed motor (not shown) and controlled by an electric clock (not shown). They are rotated in a clockwise direction and synchronized such that corresponding strips, such as 159a and 159b, will be adjacent the ends of the bar with which associated, such as 159, at the same time. The strips are also so spaced that after a predetermined interval of time based on the speed of the overall apparatus the next set of strips, namely 160a and 160b, will be adjacent the ends of the bar with which they are associated, namely 160, and so on for each successive set of strips and bar.

The transverse bar 165 is connected by means of line 176 to a power source 177 which produces direct current. Line 178 connects the power source 177 with the selsyn generator 179. Line 180 connects shaft 174 with the selsyn generator and line 181 connects shaft 175 with the selsyn generator. Lines 178a, 180a and 181a connect selsyn generator 179 to the selsyn motor 126.

As previously pointed out, bar 159 has been moved downward and positioned in response to the weight of cake 58 which was assumed to be light or less than the ideal weight. When cake 58 is fluffed up and dropped to compartment 85, another cake is weighed positioning bar 160. When cake 58 reaches compartment 88, another cake is weighed positioning, if necessary, bar 161, and so on. When cake 58 reaches the distributor chamber 108, metallic strips 159a and 159b are opposite or adjacent the ends of bar 159. In this case, 159b will contact bar 159 since the latter was lowered. This contact completes the circuit from 177 through 176, through the transverse bar 165, movable bar 159, through the metallic strip 159b and shaft 175, through line 181 to the selsyn generator 179. The generator in turn actuates or rotates the selsyn motor 126 in a clockwise direction thus raising the unit 121 by means of the rack 124 and pinion 125 in mesh therewith. CS₂ is run into container 116 as hereinbefore described and the correct amount run therefrom into the booster cylinder 114. The solenoid operated air cylinder 115 is actuated forcing the CS₂ into the distributor chamber 108 through the spray nozzles 113 where the same is mixed with the alkali cellulose by violent agitation.

When the cake being weighed is heavier than the ideal, the particular movable bar in the time delay relay 158 will be positioned by being moved upward or toward the rotating shaft 174, by means of the current passing from the source 132 through line 133, arm 131, rheostat 167, line 168, arm 138, metallic contact strip 154, insert 142, for example, line 157, through the upper coil or bar 159 and back to the power source 132 by means of line 166, thus completing the circuit. At the proper time, metallic strip 159a will contact bar 159 thus completing the circuit to the selsyn motor 126 through shaft 174, line 180 to the selsyn generator 179, and through line 180a to the selsyn motor rotating the same in a counterclockwise direction moving the cell 121 downward. This increases the distance between cells 119 and 121 thus measuring out a larger amount of $CS_2$ than is needed for an alkali cellulose cake of ideal weight.

Xanthation

After the alkali cellulose crumbs and $CS_2$ are thoroughly mixed, the bottom arcuate slide gate 182 is slid away by the actuation of the solenoid operated air cylinder 183. The actuation of the solenoid controlled cylinder 183 is controlled by the main time control system. Gate 182, as well as the top gate 109, are gastight fitting seal gates. For example, the gates may fit against neoprene seats or seats of any other material which is not subject to attack by $CS_2$ or sodium hydroxide. The mixture of $CS_2$ and alkali cellulose crumbs falls through the bottom opening in the distributor chamber 108 left by the removal of gate 182 into the xanthation "silo" 184. The solenoid operated cylinder 183 is deenergized returning gate 182 to its former position thus sealing chamber 108.

In place of the arcuate slide gates 109 and 182, a rotary gate, such as shown in Figures 1A and 1B, may be employed. The rotary gate comprises a cylindrical shell 108a rotatably mounted inside the distributor chamber 108 and having an opening 108b therein which is parallel to the axis of rotation of the shell 108a. The opening 108b is equal in size to the openings leading to chambers 91 and 184. The shell is attached by shaft 109b to the motor 109a which in turn is connected to the main time control mechanism and is operated periodically at regular predetermined time intervals based on the time cycle with which the overall apparatus is being operated. Whereas the connection to the main control mechanism is not shown, such connection would be similar to or the same as those shown in Figure 12, described hereinafter.

As shown in Figure 1A, the rotary gate is in position to allow the admittance of $CS_2$ into the distributor chamber 108 through the opening 108b. After mixing the motor 109a is actuated rotating the gate in a clockwise direction to a position such that opening 108b is above silo 184 thus allowing the crumb in chamber 108 to drop into silo 184. The motor 109a is again actuated rotating the gate in a clockwise direction to a position such that opening 108b is directly beneath chamber 91 thus allowing the next batch of disintegrated alkali cellulose crumb to fall into the distributor chamber 108. Again motor 109a is actuated rotating the gate to the position shown in Figure 1A. Then the cycle is repeated at regular predetermined time intervals.

As previously pointed out, the $CS_2$ is sprayed into the agitating zone in the form of a fine mist or cloud and mixed with the alkali cellulose crumbs for a predetermined period of time until an intimate physical mixture of the alkali cellulose crumbs and $CS_2$ has been obtained. Before chemical reaction between the alkali cellulose and $CS_2$ has been initiated or has progressed to any appreciable extent, the intimate mixture is dropped into the xanthation silo. This is so because the crumb batches are fed into the agitating zone, agitated, discharged to the reaction zone or xanthation silo and withdrawn from that zone in sequence and at predetermined time intervals such that the crumbs remain in the agitating zone for a time, the duration of which is so limited that physical admixture of the crumbs and $CS_2$ is effected and chemical reaction is not initiated, or if initiated, does not proceed beyond the initial stage while the crumbs are subjected to agitation. This has the advantage that the $CS_2$ is uniformly distributed throughout the mass of alkali cellulose crumbs without having to depend upon absorption only, which latter does not result in uniform impregnation of the alkali cellulose or a completely and uniformly xanthated cellulose. Further, the agitator is not impeded by deposition thereon of viscous clumps comprising partially reacted materials which makes for greater efficiency.

The xanthation silo 184 is preferably in the form of a cylinder open at both ends and made of alkali and $CS_2$ resistant material, preferably stainless steel. The silo is of adequate size to accommodate a predetermined volume of xanthate, which volume is based on the length of the xanthation period to be allowed. The silo is lagged on the outside with a suitable insulating material. The temperature inside the silo is controlled by means of a series of temperature control blankets laid next to the shell of the silo under the insulation. After the $CS_2$ impregnated crumb is charged in the top of the silo, it lies substantially at rest until it is discharged at the bottom. That is to say that herein, during the process of xanthation, each batch of crumbs, formerly a cake, still retains its identity and is so discharged from the bottom of the silo. The only motion in the silo, other than downward movement or displacement of the whole mass as a batch of cellulose xanthate is discharged from the bottom, is caused by shrinkage due to the reaction taking place between the alkali cellulose and $CS_2$.

Xanthate discharge

When the cellulose xanthate reaches the bottom or discharge end of the xanthation silo 184, it comes to rest on the continuous discharge belt 185 which is driven intermittently at predetermined intervals by the motor 186 which in turn is connected to and actuated by the main control system. Reference should be made to Figure 8 which shows more clearly the discharging mechanism. The discharge belt 185 has adjustable blades 187 running transverse of the direction of travel of the same. The purpose of the blades is to discharge the xanthate evenly across the bottom of the xanthation silo. The blades are movably mounted in transverse slots in the discharge belt and when in normal position are flush or even with the belt surface thus presenting one continuous smooth surface. The blades are held in this position by a metal spring 188 (see Fig. 9) positioned on either side of the blade and fastened in the center of the spring to the lower edge of the blade at 189. The ends of the spring are bowed upward resting against the under surface of the belt. This is shown at A in Figure 9. Under the upper course of belt 185 and between the rolls 190 and 191 is a cam 192 which is movable vertically and actuated by the solenoid operated air cylinder 193. At regular predetermined intervals, as determined by the main time control mechanism, when a batch of crumbs is ready to be discharged from the silo, the cylinder 193 is actuated pushing the cam 192 up against the under-surface of the belt at the same time raising the blades with which it comes in contact up above the upper surface of the belt in scraping position. The cam is, of course, positioned below the discharge opening of silo 184.

The belt proceeds from left to right as viewed in Figure 8. The left end 192a of the cam is tapered to allow the approaching blades to slide up on the cam when it is in the raised position. As the belt proceeds, the crumb is carried around the roller 191, which contacts the surface of the belt all the way across the same in order to keep the blades in raised position, and is dumped down the slide or chute 194 into the hopper 195 of the proportioning scale 196. The blades continue on around the roll 191 and after passing over the same return to their normal position by virtue of the springs 188 shown in Figure 9A. Figure 9B shows the position of the spring 188 when the blades are extended by the cam 192 and roll 191.

Positioned beneath the belt and adjacent thereto is a rotary brush 197, the purpose of which is to remove any xanthate crumb from the belt which may have adhered thereto. The brush rotates in a direction opposite to that of the belt and is aided in the cleaning operation by a spray of mixing solution (NaOH) emitted from the nozzles 198 which are fed from a main supply (not shown) by line 199. The drainage from this cleaning operation will flow to the flash mixer, described hereinafter. This cleaning operation is synchronized with the intermittent movement of belt 185 and takes place at the same time. This is accomplished by having motor 186 drive both the belt 185 and brush 197 by means of belts 185a and 197a.

In order to keep the blades from being extended as they pass around the roll 190, the same is grooved out as shown at 200 in Figure 10. This indentation in the surface of roll 190 is sufficiently large to accommodate the blades without extending the same. The blades are of such height and the belt is rotated for such a time so as to remove from the bottom of silo 184 the equivalent of one original batch of alkali cellulose or one fluffed up and xanthated cake. However, if desired, the equivalent of one or more original batches of alkali cellulose may be removed from the bottom of silo 184 each time the belt 185 is rotated. The bottom of the silo 184, the discharge belt 185, the discharge scale hopper 195 and the flash mixer 229 are totally enclosed in one common housing 201 in order to prevent the escape of CS₂ vapor into the surrounding atmosphere. The slide or chute 194 and the baffle plate 202 extend transversely of the housing 201 and are fastened to the sides thereof.

*Mixer charge measuring*

Referring to Figure 11, the scale 196 is of the bottom-discharging hopper type, with the hopper 195 taking the place of the weighing platform on an ordinary scale. The hopper 195 is supported by the arm 203 which is connected to the recording mechanism of the scale. The hopper is rectangular in shape having a V-shaped bottom formed by the movable gates 204 and 205 which are hinged at 206 and 207 respectively. The gates are normally in a closed position due to the weight of arcuate arms 208 and 209 or the same may be counterbalanced in any suitable and usual manner, and solenoid bars 210 and 211 which extend into the solenoids 212 and 213. When the solenoids 212 and 213 are energized at predetermined time intervals, the bars 210 and 211 are moved upward swinging gates 204 and 205 away from each other, opening the bottom of the hopper and allowing the xanthate crumb therein to fall into the flash mixer 229 along with the proper charge of aqueous sodium hydroxide solution. The purpose of the scale is to record the weight of each individual charge of xanthate that comes from the silo and at the same time actuate an automatic selector 214 for selecting the correct amount of aqueous sodium hydroxide for each charge of xanthate. This may be accomplished by means of a time delay relay similar to that shown in Figure 7.

Referring again to Figure 11, there is shown an illustrative selecting operation which is accomplished by use of a selsyn generator 215 which is controlled by the scale rotor 216. The generator in turn actuates the selsyn motor 217 which either raises or lowers the long probe 218 extending into the sodium hydroxide or mixer charge tank 219 by means of a pinion 220 on the motor shaft 221 in mesh with a rack 222 to which the probe 218 is fastened. This long probe 218 gages the correct amount of mixer charge to be delivered from the mixer charge tank 219 to the flash mixer 229 for each charge of xanthate.

The mixer liquor or aqueous sodium hydroxide solution is brought to the gaging container or tank 219 through pipe 223 and solenoid valve 224. In addition to the long probe 218, there is a short probe 225 which also extends into tank 219. The short probe 225 is in a fixed position and controls the closing of valve 224 through a relay 226. The mixer charge flows from container 219 through the solenoid valve 227 and pipe 228 directly into the flash mixer 229. When the batch of xanthate crumbs in the hopper 195 is less than the normal weight, the rotor 216 and pointer 230a of the proportioning scale 196 will rotate in a counterclockwise direction. This in turn will rotate the pinion 216a securely fastened to rotor 216 in the same direction. The pinion 216a positions the rotor or armature of selsyn generator 215 by means of the link chain 230 connected between pinion 216a and pinion 215a on the rotor or shaft of selsyn generator 215. The generator in turn positions the pinion 220 on the shaft 221 of the selsyn motor 217. By means of the pinion 220 being in mesh with rack 222, to which the long probe 218 is fastened, the latter is raised thus measuring out a decreased amount of aqueous caustic soda solution. When the batch of xanthate crumbs is too heavy, then the rotors rotate in the opposite or clockwise direction thus lowering probe 218 measuring out an increased amount of aqueous caustic soda solution or mixer charge. The circuit from power source 231 to generator 215 is always complete. However, selsyn motor 217 is not actuated unless the rotor of generator 215 is rotated.

In the meantime, while probe 218 is being positioned, valve 224 has been opened by the main timing and control mechanism and charge liquor has entered tank 219 until the level reached probe 225 which cut off valve 224. The main control mechanism opens valve 227 allowing the mixer charge to flow into the flash mixer until the level falls below the tip of probe 218 which closes valve 227. The probe 218 is then centered by means of solenoids, not shown but similar to those used to center unit 121 as shown in Figure 7. The measuring device 1 and also 1a is similar to 214 except that the long and short probes therein are fixed since the same amount of steep liquor is measured out each time. The selsyn generator and motor are also eliminated in measuring devices 1 and 1a.

The mixer charge flows down the lower inclined side 201a of the housing 201 to the flash mixer and at the same time cleans the surface of any xanthate crumbs which might have stuck thereon when dropped from the hopper 195.

Xanthate slurrying

The chamber of the flash mixer 229 (see Figure 2) is made of alkali-resistant material, preferably stainless steel, and is jacketed with brine for cooling. In the bottom thereof, there is a discharge gate 230 which is a ground seat plug valve operated by the solenoid actuated air cylinder 231. The valve opens and closes the pipe line 232 leading to the roll disintegrator 233 through the magnetic separator 234. The spinner or agitator consists of a shaft 235 extending upwardly into the mixer chamber through the bottom thereof and having spring wire spokes 236 forced through holes in the shaft and laid out spirally around the same approximately 1¼ inches apart. The ends of the spokes extend outwardly almost to the inside wall of the mixer chamber. One quarter inch clearance between the spokes and inside wall has been found to be satisfactory. On the lower end of the shaft outside the mixer chamber is a pulley 237 which in turn is connected to the pulley 238 on the shaft of motor 239 by means of the belt 240. The motor 239 which is fastened to the outside of the mixer chamber rotates the spinner at approximately 1000 R. P. M. This speed may be varied depending on the viscosity of the solution or slurry being mixed.

The purpose of the flash mixer is to make a preliminary slurry of the xanthate and mixer charge and deliver it to the roll disintegrator at a constant consistency and a constant temperature. The temperature is maintained by a thermocouple (not shown) which controls the flow of brine through the jacket around the mixer chamber.

Magnetic separation

The magnetic separator 234 is of the permanent magnet type, the purpose of which is to remove any ferrous or metallic particles from the viscose slurry before it goes to the roll disintegrator 233. A magnetic separator of the type shown and described in our copending application Serial No. 128,346, filed November 19, 1949, has been found to be satisfactory.

Viscose dissolution

The roll disintegrator 233 comprises a housing 240 enclosed in which is a pair of smooth, closely spaced rollers 241 and 241a which are rotated at the same peripheral velocity in the nip by the motor 242. The slurry coming from the flash mixer is ground or rolled to a homogeneous solution or dispersion of viscose by the rollers as it passes between the same. The viscose then passes out through line 243 to the pump 244 which pumps the viscose continuously through line 245 to the storage tanks or wherever it may be desired that the same be used. In place of the roll disintegrator shown in Figures 1 and 2, any convenient and suitable disintegrator or apparatus for forming a viscose solution from a slurry of sodium cellulose xanthate and aqueous sodium hydroxide solution may be employed. The apparatus and the various embodiments thereof shown and described in our copending patents 2,539,437, January 30, 1951 and 2,622,855, December 23, 1952, may likewise be employed in place of the roll disintegrator shown in Figures 1 and 2.

While the slurry is fed from the flash mixer to the disintegrator in intermittent fashion, the viscose leaves the latter in a continuous stream. The time cycle on the apparatus is so set up that this is possible since the nip of rollers 241 and 241a is such that the viscose will not pass through the same too rapidly.

If desired, the apparatus may be set up so that the scale 196 actuates the motor 186 which drives the discharge belt 185. The dial of scale 196 would be provided with a limit switch or contact which could be set at any predetermined weight. Motor 186 would be started and as the crumb fell in hopper 195 the hand 230a of the scale would move in a clockwise direction until it contacted the limit switch and closed the same. The switch connected to a relay would cause the circuit to motor 186 to open thus stopping the same. In this way the same amount of xanthate crumb would be discharged each time which in turn would simplify the mixer charge measuring apparatus 214. The probes 218 and 225 would be fixed since the same charge of aqueous sodium hydroxide solution would be used each time which would eliminate the use of the selsyn generator 215 and selsyn motor 217 and the parts connected therewith.

Time control system

Figure 12 is illustrative of electrical connections which may be used in operating the apparatus shown in Figures 1 and 2. Any suitable time controlled electrical system may be employed. In the description of Figure 12, reference should also be made to the other figures of the drawing with which the particular section of the system in Figure 12 is concerned.

In Figure 12 there is shown a disc control system by means of which the entire operation of the apparatus is automatically controlled and all operations are synchronized from the time the pulp sheets are placed in the steep tanks 4 and 4a until the viscose runs from the roll disintegrator 233. The system comprises a main control shaft 246 having a number of individual contact discs mounted thereon. Each disc is of insulating material and its periphery is provided with one or more metallic inserts. The shaft is supported in bearings 247 and 248 and rotated by a constant speed motor 249 through reduction gearing 250 which can be adjusted to give the desired operating cycle of the entire apparatus. As shaft 246 rotates, the metallic inserts in the contact discs are brought successively into contact with respective leads and terminals for actuating the various parts of the continuous viscose plant in the desired sequence. Each disc controls one distinct operation of the plant through electrical contact and can be adjusted to any desired position to change the sequence or duration of its specific operation without affecting any of the other operations. Also, while not shown, manual switches may be placed in each of the lines leading from the discs so that any particular operation may be cut out or eliminated when desired, particularly when something goes wrong.

At the start of operations, master switch 254 is closed, whereupon motor 249 is started and shaft 246 begins to rotate. For convenience of description, the sequence of operations will be described with reference to a five-minute cycle, although any other time period may be employed. The shaft 246 makes one complete revolution every ten minutes. Thus, discs controlling operations which must take place every five minutes will have two equally spaced metallic inserts on the periphery thereof. Metallic insert 252 is brought into contact with lead lines 253, causing solenoid 254 to open valve 255 filling tank 1 with steep liquor (aqueous sodium hydroxide) until it contacts probe 256 which closes valve 255. Metallic insert 257 contacts lead lines 258 causing solenoid 259 to open valve 260 allowing the steep liquor to run into tank 4 in which the pulp has been previously placed until the tip of probe 261 is uncovered which closes valve 260. This operation takes place every 10 minutes since in the meantime the apparatus in connection with tank 1a is actuated so that they operate alternately in five-minute cycles.

Metallic insert 262 contacts lead lines 263 causing solenoid 264 to open valve 265 filling tank 1a with steep liquor until the same contacts probe 266 which closes valve 265. Insert 267 contacts lines 268 causing solenoid 269 to open valve 270 allowing the steep liquor to run into tank 4a until probe 271 is uncovered closing valve 270. It should be understood that where necessary all solenoids and solenoid operated air cylinders are equipped with springs to return them to their starting position when deenergized. Also, while the metallic inserts are being described in the order in which they are placed on the shaft, their operations do not necessarily follow in that order. For example, the stirrer or spring wire beater in tank 4 will be in operation while tank 1a and subsequently 4a are being filled with pulp and steep liquor.

Metallic insert 272 contacts lead lines 273 which starts the beater motor 7 on tank 4 forming the slurry of pulp and steep liquor. This motor runs so long as the lead lines are in contact with the metallic insert which is of appropriate size depending on the length of time of mixing desired. The same is true of metallic insert 274 which contacts lines 275 actuating the motor 7' on tank 4a.

When the contents of tank 4 have been thoroughly mixed and the slurry formed, metallic insert 276 contacts lead lines 277 causing solenoid 278 to tip tank 4 dumping its contents by causing the rack to rotate the pinion. Tank 4 being counterbalanced will return to an upright position when solenoid 278 is deenergized. At the proper time, tank 4a is similarly dumped by reason of metallic insert 279 contacting lead lines 280 thus actuating solenoid 281. As each tank dumps plate 21 is removed from the top of press 15 and conduit 17 lowered into the press opening. This is accomplished by metallic insert 285 contacting lead lines 286 causing solenoid 287 to actuate air cylinder 20 removing plate 21 and by metallic insert 282 contacting lead lines 283 causing solenoid 284 to actuate air cylinder 18 lowering conduit 17. There are two metallic inserts on disc 282 since the conduit 17 must be lowered every five minutes. When the slurry is in position in press 15, metallic insert 288 contacts lead lines 289 causing solenoid 290 to actuate the hydraulic cylinder 23 of the press. This occurs twice every five minutes since the pressure must be released to remove plate 21 after which pressure must again be applied to raise the cake out of the press. Thus, on disc 285 there are four metallic inserts, first to admit the slurry and then to allow the pressed cake of alkali cellulose to emerge from the press and push the same onto belt 40 every five minutes.

After the cake has been positioned adjacent the tower for which it is destined, it is pushed off the belt by either of the cake pushers 43 and 43a. Metallic insert 291 contacts lead lines 292 causing solenoid 293 to actuate cylinder 43 and insert 294 contacts lead lines 295 causing solenoid 296 to actuate cylinder 43a. The inserts 291 and 294 are so arranged that cylinder 43a is actuated five minutes after cylinder 43 and so on alternately at five-minute intervals. The cakes are pushed on the tower loading platens 44 and 44a which are actuated alternately at five-minute intervals, each platen being actuated every ten minutes. Insert 297, by contacting lead lines 298 causing solenoid 299 to actuate cylinder 45, controls platen 44 and insert 300, by contacting lead lines 301 and causing solenoid 302 to actuate cylinder 45a, controls platen 44a. Before either platen is actuated, however, the forked gates 49 and 49a must be removed from the base of the towers 41 and 42. This is accomplished by metallic insert 303 contacting lead lines 304 causing solenoid 305 to actuate cylinder 51 connected to gate 49 and metallic insert 306 contacting lead lines 307 causing solenoid 308 to actuate cylinder 51a connected to gate 49a. These gates are actuated alternately at five-minute intervals.

When the cake emerges from the top of the towers and the adjustable top sections have been positioned by the mechanism hereinbefore described, the pushers 60 and 60a push the cakes off to the belt 67 which runs continuously. Metallic insert 309 contacts lead lines 310 causing solenoid 311 to actuate the cylinder 60 and metallic insert 312 contacts lead lines 313 causing solenoid 314 to actuate cylinder 60a. These cake pushers are actuated alternately at five-minute intervals.

The belt carries the cakes to the proportioning scale and then they are pushed into the continuously running cake breaker and fluffers by means of cylinder 71 which is actuated by solenoid 317 which in turn receives its impulse by metallic insert 315 contacting lead lines 316.

In order for the fluffed cake to enter chamber 85, the distributor chamber 108 must be empty since the batches in the chambers in 87 must all move down one step. Consequently, these operations really take place in reverse order. That is to say, insert 333 contacts lines 334 causing solenoid 335 to actuate cylinder 183 and open the bottom arcuate slide gate 182 of chamber 108. When the gate has closed, insert 330 contacts lines 331 causing solenoid 332 to actuate cylinder 110 and open the top slide gate 109 dumping the crumbs from 91 into 108. The motor drives the mixer in 108 continuously. Insert 327 contacts lines 328 causing solenoid 329 to actuate cylinder 99 rotating damper 95 dropping the crumbs from 90 into 91. Damper 95 is closed and insert 324 contacts lead lines 325 causing solenoid 326 to actuate cylinder 98 rotating damper 94 dropping the crumbs from 89 into 90. Damper 94 is closed and insert 321 contacts lead lines 322 causing solenoid 323 to actuate cylinder 97 rotating damper 93 dropping the crumbs from 88 into 89. Damper 93 is then closed and insert 318 contacts lead lines 319 causing solenoid 320 to actuate cylinder 96 rotating damper 92 dropping the crumbs from 85 into 88. All these actions take place in rapid succession before the next cake is pushed from the proportioning scale so that chamber 85 may be empty to receive the fluffed crumb. There are two inserts on each disc since these operations take place at five-minute intervals. When the embodiment shown in Figures 1A and 1B is employed, metallic inserts 330 and 333 which control the action of the arcuate slide gates 109 and 182 are replaced by a disc having several inserts thereon each corresponding to a separate partial clockwise rotation of rotary gate 108a and each insert is made of such arcuate extent that the motor 109a runs long enough to rotate the gate to the desired position.

Insert 336 contacts lead lines 337 causing solenoid 338 to open valve 118 allowing CS₂ to enter the gaging container 116. The valve is closed by photo-cell 119. Insert 339 contacts lead lines 340 causing solenoid 341 to open valve 123 allowing the CS₂ to enter the booster cylinder 114. Valve 123 is closed by photo-cell 121. Immediately upon closing the valve, cell 121 is centered by insert 342 contacting lead lines 343 which in turn actuates the oppositely opposed solenoids 128 and 129. While cell 121 is being centered, insert 344 contacts lead lines 345 causing solenoid 346 to actuate cylinder 115 forcing the CS₂ in the booster cylinder into chamber 108.

While the mixing of the alkali cellulose crumb and CS₂ is taking place, a batch of xanthated crumb is being removed from the bottom of the xanthation silo. Insert 347 contacts lead lines 348 turning on motor 186 which runs a sufficient length of time to remove one batch of xanthated crumb as determined by the length of the insert on 347.

Simultaneously with the actuation of motor 186, cylinder 193 raises cam 192 by reason of metallic insert 359 contacting lead lines 360 thus causing solenoid 360a to actuate cylinder 193.

The xanthated crumb drops into the hopper scale and the correct mixer charge measured out as hereinbefore described (see Figure 11). Insert 349 contacts lead lines 350 which causes solenoid 351 to open valve 224 which is later caused to close by probe 225. Insert 352 contacts lead lines 353 causing solenoid 354 to open valve 227 which is later closed by probe 218. As valve 227 is opened, inserts 355 and 356 contact lead lines 357 and 358 simultaneously causing solenoids 212 and 213 to open the bottom of hopper 195 allowing the xanthated crumb to drop to the flash mixer along with the mixer charge. When the contents are in the flash mixer, insert 361 contacts lead lines 362 starting motor 239 which runs the mixer. After being thoroughly mixed for a short time, valve 231 is opened by solenoid 365 which in turn is actuated by insert 363 contacting lead lines 364. The viscose or viscose slurry then passes to the roll disintegrator which runs continuously.

In place of the discs with metallic inserts, cams may be employed, each cam performing or controlling a specific operation in sequence at predetermined time intervals by the rise of the cam closing a spring switch arm, there being one such cam and switch arm for each specific operation to be performed. The cams would be arranged on the shaft 246 in similar fashion as are the discs in Figure 12. The discs or cams on the main control shaft can be adjusted to any desired position to change the sequence or duration of its specific operation without affecting any of the other operations.

As previously pointed out, the time cycle may be varied depending upon how much viscose it is desired to produce. Using a five-minute cycle with an apparatus having two mercerizing towers, viscose is produced at the rate of 13.5 pounds every five minutes or 1224.7 grams per minute. This amounts to processing 12 pounds of dry pulp per hour.

The cellulose xanthate obtained in accordance with the present invention is of superior quality and consists of a ball-less fluffy mass of mealy consistency which dissolves rapidly in sodium hydroxide, water, or a mixture of the two. It is easily converted to viscose which is practically fiber-less, and more readily filtered than conventional viscoses and is characterized by improved spinnability. Since the CS₂ is accurately measured, there is no excess present which minimizes the possibility of by-products being formed due to reaction between CS₂ and NaOH solvent for the xanthate which enhances the quality of the artificial fibers, films, and other products obtained by coagulation of the viscose and regeneration of the cellulose.

To insure safety in the operation of the apparatus, the following sections of the equipment are provided with explosion relief areas: air crumb separator, carbon disulfide vapor seal chambers, distributor chamber, xanthation silo, and the discharge belt housing. These relief areas are designed to fracture when a predetermined excess pressure caused by the CS₂ prevails in any one of the above-mentioned areas. It is also desirable for safety's sake that the entire area in the equipment location be protected by an automatic carbon dioxide system.

It is to be understood that changes and variations may be made without departing from the spirit and scope of the invention as defined in the appended claims.

We claim:
1. In a process for producing viscose the steps comprising steeping and shredding cellulose in an aqueous alkaline solution, pressing the steeped cellulose to form a cake thereof having a predetermined ratio of alkali cellulose to original dry cellulose, ageing the alkali cellulose cake by passing it through a path in intermittent steps, disintegrating the cake, mixing the disintegrated cake with carbon disulfide, reacting the disintegrated cake with carbon disulfide to form cellulose xanthate therefrom, mixing the cellulose xanthate with an aqueous alkaline solution to form a xanthate slurry, and homogenizing said slurry.

2. In a process for producing viscose the steps comprising steeping and shredding cellulose in an aqueous caustic soda solution, pressing succeeding portions of the steeped cellulose to form cakes thereof having a predetermined ratio of alkali cellulose to original dry cellulose, aging the alkali cellulose cakes by passing them through an enclosed temperature regulated path in intermittent steps, disintegrating the cakes, successively reacting the disintegrated cakes with carbon disulfide to form distinct masses of cellulose xanthate therefrom, successively mixing the xanthate masses with an aqueous caustic soda solution to form xanthate slurries, and homogenizing said slurries.

3. In a process for continuously producing viscose, the steps comprising steeping and shredding cellulose in an aqueous alkaline solution, pressing succeeding portions of the steeped cellulose to form cakes thereof having a predetermined size and ratio of alkali cellulose to original dry cellulose, aging the alkali cellulose cakes by passing them through a path in intermittent steps, disintegrating the cakes, successively reacting the disintegrated cakes with carbon disulfide to form distinct masses of cellulose xanthate therefrom, successively mixing the xanthate masses with an aqueous alkaline solution to form xanthate slurries, and homogenizing the slurries continuously to produce a continuous flow of viscose.

4. A process for producing viscose as defined in claim 3 wherein the path through which the pressed cakes pass on aging is an enclosed temperature regulated path.

5. A process for continuously producing viscose as defined in claim 3 wherein the cellulose is steeped in 18% aqueous caustic soda solution, and succeeding portions of the steeped cellulose are pressed to form cakes thereof having a 2.75 to 1 ratio of alkali cellulose to original cellulose, and the path through which the pressed cakes pass on aging is an enclosed temperature regulated path.

6. In a process for continuously producing viscose, the steps comprising steeping and shredding cellulose in an aqueous alkaline solution to form a slurry thereof, pressing vertically upwardly succeeding portions of the steeped cellulose slurry to form cakes thereof having a predetermined ratio of alkali cellulose to original dry cellulose while removing the pressed out aqueous alkaline steeping solution in a downward path, aging the alkali cellulose cakes by passing them through a path in intermittent steps, disintegrating the cakes, successively reacting the disintegrated cakes with carbon disulfide to form distinct masses of cellulose xanthate therefrom, successively mixing the xanthate masses with an aqueous alkaline solution to form xanthate slurries, and homogenizing said slurries continuously to produce a continuous flow of viscose.

7. In a process for continuously producing viscose, the steps comprising steeping and shredding cellulose in an aqueous alkaline solution to form a slurry thereof, pressing succeeding portions of the steeped cellulose slurry to form cakes thereof having a predetermined ratio of alkali cellulose to original dry cellulose, aging the alkali cellulose cakes by passing them upwardly through a vertical path in intermittent steps, passing the aged cakes to a second vertical path, and passing the cakes downwardly through said second path while disintegrating the cakes, successively reacting the disintegrated cakes with carbon disulfide to form distinct masses of cellulose xanthate therefrom, successively mixing the xanthate masses with an aqueous alkaline solution to form xanthate slurries, and homogenizing said slurries continuously to produce a continuous flow of viscose from the bottom of the second vertical path.

8. In a process for continuously producing viscose, the steps comprising steeping and shredding cellulose in an aqueous alkaline solution to form a slurry thereof, pressing vertically upwardly succeeding portions of the steeped cellulose slurry to form cakes thereof having a predetermined ratio of alkali cellulose to original dry cellulose while removing the pressed out aqueous alkaline steeping solution in a downward path, aging the alkali cellulose cakes by passing them upwardly through a vertical path in intermittent steps, passing the aged cakes to a second vertical path and passing the cakes downwardly through said path while disintegrating the cakes, successively reacting the disintegrated cakes with carbon disulfide to form distinct masses of cellulose xanthate therefrom, successively mixing the xanthate masses with an aqueous alkaline solution to form xanthate slurries, and homogenizing said slurries continuously to produce a continuous flow of viscose from the bottom of the second vertical path.

9. A process for continuously producing viscose as defined in claim 7 wherein the vertical paths are enclosed temperature controlled paths.

10. A process for continuously producing viscose as defined in claim 7 wherein the cellulose is steeped and shredded in 18% aqueous caustic soda solution and the resultant slurries are pressed to a ratio of 2.75 to 1 of alkali cellulose to original dry cellulose.

11. In a process for continuously producing viscose, the steps comprising steeping and shredding cellulose in an 18% aqueous caustic soda solution to form a slurry thereof, pressing vertically upwardly succeeding portions of the steeped cellulose slurry to form cakes thereof having a 2.75 to 1 ratio of alkali cellulose to original dry cellulose while removing the pressed out aqueous alkaline steeping solution in a downward path, aging the alkali cellulose cakes by passing them upwardly through an enclosed temperature controlled vertical path in intermittent steps, passing the aged cakes to a second enclosed temperature controlled vertical path and passing the cakes downwardly through said path while disintegrating the cakes, successively reacting the disintegrated cakes with carbon disulfide to form distinct masses of cellulose xanthate therefrom, successively mixing the xanthate masses with an aqueous caustic soda solution to form sodium cellulose xanthate slurries, and homogenizing said slurries continuously to produce a continuous flow of viscose from the bottom of the second vertical path.

12. In a process for continuously producing viscose, the steps comprising steeping and shredding cellulose in an aqueous alkaline solution to form a slurry thereof, pressing vertically upwardly succeeding portions of the steeped cellulose slurry to form cakes thereof having a predetermined ratio of alkali cellulose to original dry cellulose while removing the pressed out aqueous alkaline steeping solution in a downward path, aging the alkali cellulose cakes by passing them upwardly through a vertical path in intermittent steps, passing the cakes to a second vertical path, weighing the cakes, passing the cakes downwardly through said second vertical path while disintegrating the cakes, successively reacting the disintegrated cakes with an amount of carbon disulfide based on the weight of the cakes to form distinct masses of cellulose xanthate therefrom, successively mixing the xanthate masses with an aqueous alkaline solution to form xanthate slurries, and homogenizing said slurries continuously to produce a continuous flow of viscose from the bottom of the second vertical path.

13. In a process for continuously producing viscose, the steps comprising aging pressed alkali cellulose cakes having a predetermined ratio of alkali cellulose to original dry cellulose by passing them upwardly through a vertical path in intermittent steps, passing the aged cakes to a second vertical path and passing the cakes downwardly through said path while disintegrating the cakes, successively reacting the disintegrated cakes with carbon disulfide to form distinct masses of cellulose xanthate therefrom, successively mixing the xanthate masses with an aqueous alkaline solution to form xanthate slurries, and homogenizing said slurries continuously to produce a continuous flow of viscose from the bottom of the second vertical path.

14. A process for producing viscose comprising steeping and shredding cellulose in an aqueous alkaline solution, pressing the steeped cellulose to form a cake thereof having a predetermined ratio of alkali cellulose to original dry cellulose, aging the alkali cellulose cake, disintegrating the cake, mixing the disintegrated cake with carbon disulfide, reacting the disintegrated cake wtih carbon disulfide to form a cellulose xanthate, mixing the xanthate with an aqueous alkaline solution to form a xanthate slurry, and homogenizing said slurry.

15. In a process for producing viscose the steps comprising steeping and shredding cellulose in an 18% aqueous caustic soda solution, pressing succeeding portions of the steeped cellulose to form cakes thereof having a 2.75 to 1 ratio of alkali cellulose to original dry cellulose, disintegrating the cakes, successively reacting the disintegrated cakes with carbon disulfide, successively mixing the reacted cakes with an aqueous alkaline solution to form xanthate slurries, and homogenizing said slurries.

16. In a process for continuously producing viscose in steps comprising steeping and agitating cellulose in an aqueous alkali solution to form a slurry thereof, pressing aqueous alkali solution out of succeeding portions of the slurry to form cakes having a predetermined size and ratio of alkali cellulose to original dry cellulose, ageing the alkali cellulose cakes while passing them through a path, disintegrating the cakes successively, successively reacting the disintegrated cakes with carbon disulfide to form distinct masses of cellulose xanthate therefrom, successively mixing the xanthate masses with an aqueous alkali solution to form xanthate slurries, and homogenizing said slurries continuously to produce a continuous flow of viscose.

17. An apparatus for producing viscose comprising in combination cellulose steeping means, shredding means in the steeping means, hydraulic means below the steeping means for pressing a slurry to form a cake, vertically movable conduit means connecting the steeping and pressing means, endless belt means adjacent the pressing means for removing the pressed cakes therefrom, means above the pressing means to transfer the cakes from the pressing means to the belt means and means for controlling the operation of aforementioned means sequentially and periodically at predetermined time intervals.

18. An apparatus for producing viscose comprising in combination, rotatable tank steeping means, solenoid actuated means for rotating the steeping means about a horizontal axis, electrical shredding means in the rotatable tank steeping means, solenoid actuated hydraulic means below the steeping means for pressing a slurry to form a cake, vertically movable conduit means connecting the steeping and pressing means, solenoid actuated pneumatic means for actuating the conduit means to move the same into and out of position for loading the pressing means, and cake actuated electrical endless belt means adjacent the pressing means for removing the pressed cakes therefrom, all of said means being actuated periodically and sequentially at predetermined time intervals by a time regulated central electrical controlling means.

19. An apparatus for producing viscose comprising in combination, cellulose steeping means, means for pressing a slurry to form a cake, conduit means connecting the steeping and pressing means, cake aging means, cake coveying means joining the cake pressing and aging means, cake removing means adjacent the aging means, all of said means being arranged in series and means for controlling the operation of aforementioned means sequentially and periodically at predetermined time intervals.

20. An apparatus for producing viscose comprising in combination, rotatable tank steeping means rotatable about a horizontal axis, shredding means in the rotatable tank steeping means, means for pressing a slurry to form a cake, conduit means connecting the steeping and pressing means, cake aging means, cake conveying means joining the cake pressing and aging means, cake removing means adjacent the aging means and means for controlling the operation of aforementioned means sequentially and periodically at predetermined time intervals.

21. An apparatus for producing viscose comprising in combination, rotatable tank steeping means rotatable about a horizontal axis, shredding means in the rotatable tank steeping means, hydraulic means for pressing a slurry to form a cake, conduit means connecting the steeping and pressing means, vertical cake aging means, cake conveying means joining the cake pressing and aging means, cake removing means adjacent the aging means and means for controlling the operation of aforementioned means sequentially and periodically at predetermined time intervals.

22. An apparatus for producing viscose comprising in combination, rotatable tank steeping means rotatable about a horizontal axis, shredding means in the rotatable tank steeping means, hydraulic means below the steeping means for pressing a slurry to form a cake, vertically movable conduit means connecting the steeping and pressing means, vertical cake aging means, endless belt cake conveying means joining the cake pressing and aging means, cake removing means adjacent the aging means and means for controlling the operation of aforementioned means sequentially and periodically at predetermined time intervals.

23. An apparatus for producing viscose comprising in combination, cellulose steeping means, shredding means in the steeping means, hydraulic means below the steeping means for pressing a slurry to form a cake, vertically movable conduit means connecting the steeping and pressing means, vertical enclosed temperature regulated aging means, endless belt cake conveying means between the cake pressing and aging means, endless belt cake removing means adjacent the adging means and means for controlling the operation of aforementioned means sequentially and periodically at predetermined time intervals.

CHARLES D. VANDENBURGH.
MAURICE P. KULP.

References Cited in the file of this patent

UNITED STATES PATENTS

| Number | Name | Date |
|---|---|---|
| Re. 22,489 | Schlosser et al. | May 30, 1944 |
| 1,842,688 | Richter | Jan. 26, 1932 |
| 1,958,845 | Burns | May 15, 1934 |
| 2,222,050 | Stoeckly | Nov. 19, 1940 |
| 2,364,392 | Schmitz | Dec. 5, 1944 |
| 2,498,071 | Dalziel et al. | Feb. 21, 1950 |